Inventor
HANS WERNER JOHANNSEN
BY

Inventor
HANS WERNER JOHANNSEN.
BY

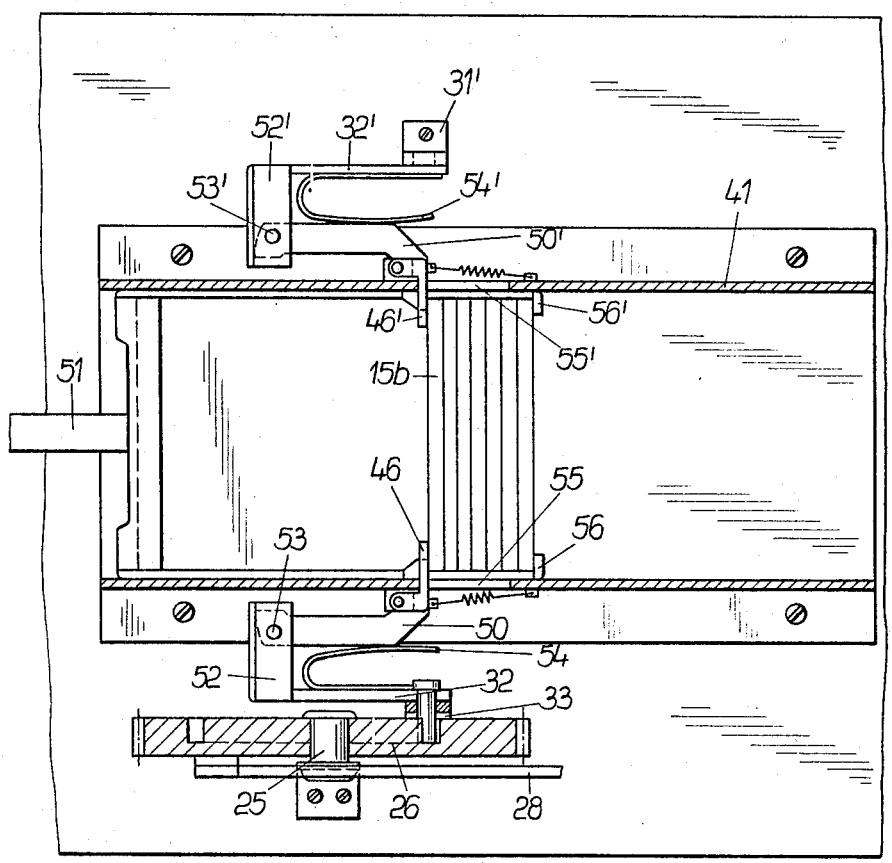

United States Patent Office 3,394,477
Patented July 30, 1968

3,394,477
CHANGING DEVICE FOR A LANTERN SLIDE
Hans Werner Johannsen, Frankfurt am Main, Germany, assignor to Braun Aktiengesellschaft
Filed Apr. 25, 1966, Ser. No. 545,103
Claims priority, application Germany, May 19, 1965, B 82,005
8 Claims. (Cl. 40—79)

ABSTRACT OF THE DISCLOSURE

A changing device for lantern slides comprising a container adapted to support a plurality of superimposed stacked slides and having a discharge end from which successive slides are to be discharged in their own plane, each successive slide at said discharge end having a forward edge in the direction of discharge and a following edge, an engaging device engageable with the following edge of each successive slide to move it in said direction out of registration with the successive slides, and actuating device engageable with the following edge of each successive slide after the latter has been moved by said engaging means for discharging such slide.

Field of the invention

The present invention is directed to a changing device for projectors with framed diapositives (lantern slides) stacked in a storage container without side bars (cross pieces), wherein the lowermost diapositive is brought in each case into the projecting aperture by means of an actuator.

Description of the prior art

As is well known, changing devices of this type have the advantage that the diapositives are stacked in storage containers closely adjacent each other and thus require only the smallest space for storing. In addition thereto, the containers receiving a stack of slides are very simply constructed—in contrast to the partitioned magazines—and can thus be manufactured inexpensively.

Imperfectly solved in these changing devices is the actuation of the successively lowermost slides of the storage stack into the picture gate. For this purpose a driver engages a shoulder portion thereof against the edge of the lowermost slide, this edge being disposed opposite the feeding direction, and while pushing it ahead in the changing direction, moves it into the picture gate. Difficulties are caused by the varying width and edge formation of the various slide frames. For cardboard frames, for example, the effective butting surface must be narrow. The driver will then grasp, however, only a very small portion of the edge of the considerably thicker plastic frames and can easily glide off the edges which are generally rounded. If, on the other hand, the shoulder portion is made wider, it cooperates well with plastic or with glass frames, but in the case of cardboard frames, will protrude beyond one frame edge and, during the feeding operation, will easily engage—in addition to the lowermost slide—also the slide being positioned thereabove.

With a view toward improving the operation of the slide-changing device, actuators have already been proposed which have chamfered shoulder portions intended to lift the stack of slides, after the beginning of the actuating movement, off the slide positioned to be actuated. In all of these devices, however, the entire stack will initially rest or weigh on the slide which has been engaged by the actuator so that here again the above-mentioned functional disturbances cannot be eliminated when the slide positioned in front is actuated.

It is therefore an object of the present invention to provide a slide-changing device or mechanism for framed slides stacked in a container or magazine without side bars, which operates in a functionally safe manner with any conventional types of frames, such as cardboard, plastic, or glass frames.

Summary of the invention

In accordance with the present invention, the changing device for projectors for framed slides stacked in a storage container or magazine without side bars is provided with at least one disengaging member which initially moves the slide disposed within the changing plane away from the stack, before it is brought into the aperture of the projector by either one or several actuators which preferably glide along the next succeeding slide frame.

The disengaging member is controlled by the driver and/or drivers, or by a guide or carriage for the latter, in such a manner that already during the return into the starting position of the guide or carriage, the disengaging member will be brought into its active position so that the diapositive or lantern slide positioned to be fed to the projection is moved away from the stack prior to the beginning of the changing operation, i.e., prior to being engaged by the actuators. In this manner, the actuators will definitely make contact with or come to bear on the succeeding diapositive or lantern slide frame when the changing operation is initiated and will therefore engage with certainty the lantern slide positioned in the changing plane.

Brief description of the drawings

Further details of the present invention will be described hereinafter in one embodiment thereof on the basis of the accompanying drawings, wherein:

FIGURE 6 is a similar sectional view of the feeding mechanism shown in FIGURE 5 after the completion of one switching or changing step, taken along line 6—6 of FIGURE 2.

Description of the preferred embodiments

Figure 1:
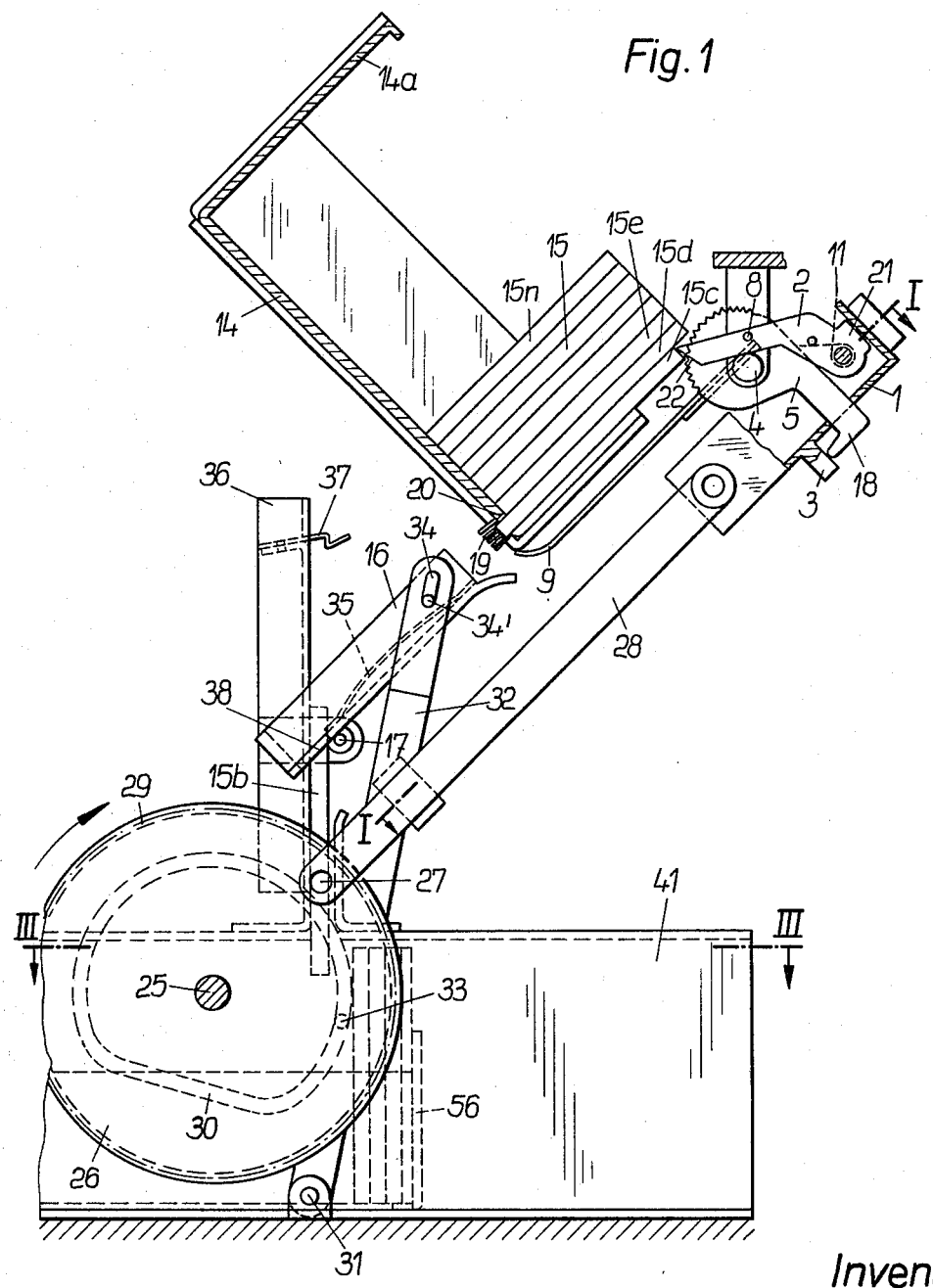
FIGURE 1 is a side elevation of the changing device at the beginning of the changing operation, partly in cross section.
Figure 2:
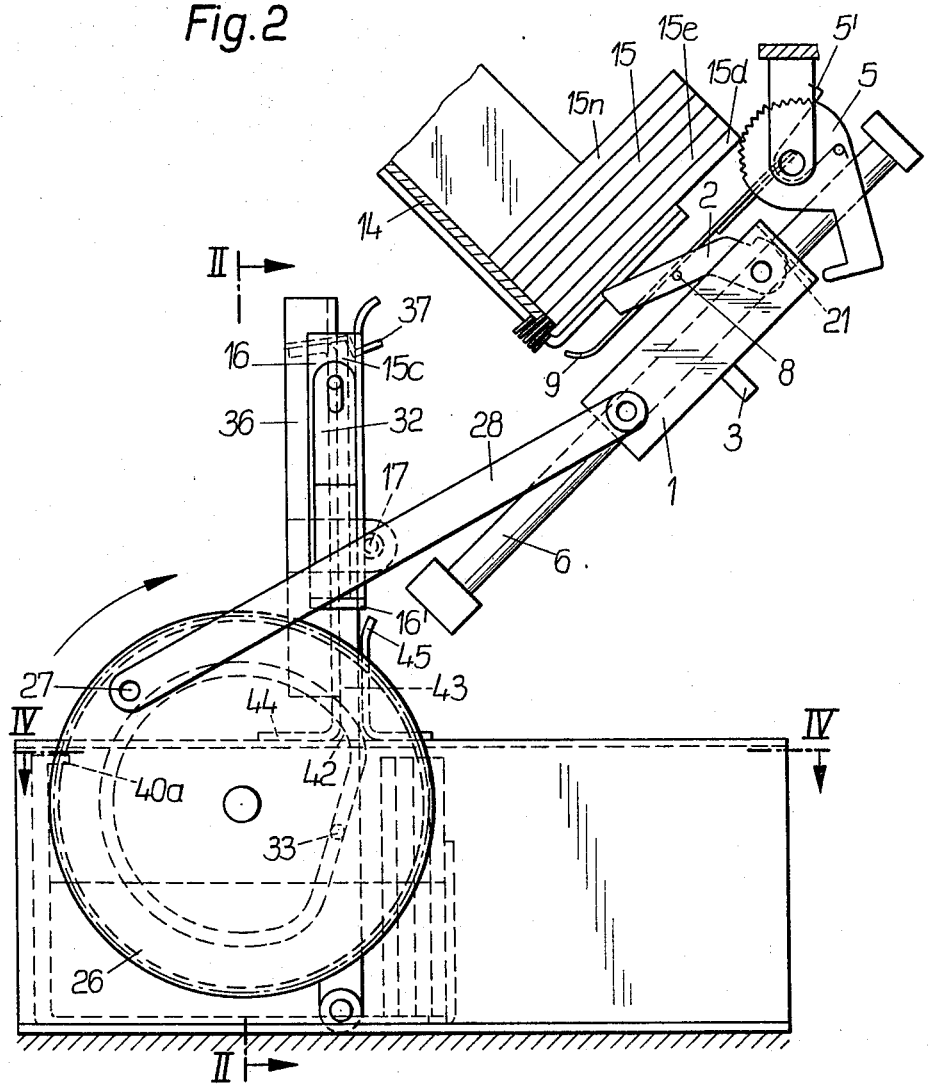
FIGURE 2 shows the changing device according to FIGURE 1 shortly prior to the completion of the changing operation, during the return into the starting position thereof.
Figure 3:
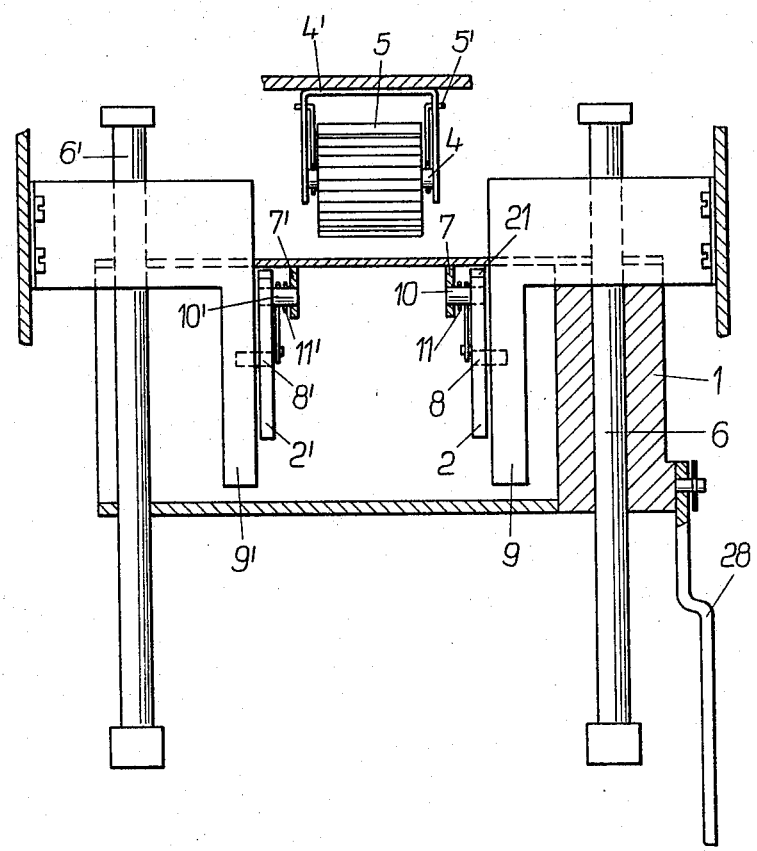
FIGURE 3 is a section substantially on line 3—3 of FIGURE 1, parts being shown in elevation.

The changing device illustrated in FIGURES 1 to 3 consists essentially of a guide or carriage 1 rectilinearly guided parallel to the changing plane and comprising actuators 2 and 2′ pivotally connected thereto and a stop member 3 for actuating a disengaging member 5 pivoted on a stationary axis 4. This disengaging member is urged to turn clockwise out of the zone or range of the stack of diapositives by means of torsion springs 11 and 11′ coiled about the bearing axle 4 thereof and supported against the stationary bearing cap 4′, and the disengaging member will be held in the position according to FIGURE 2 by means of a suitable stop member not shown. As shown in FIGURE 3, the changing guide or carriage 1 is guided rectilinearly on two guide rods 6 and 6' which latter extend parallel to the changing plane. Angularly disposed at the upper crossbar 1' of this changing guide or carriage are two bearing strips 7 and 7', and the drivers 2 and 2' are respectively pivotally positioned on the latter. The drivers are provided with studs 8 and 8', which are respectively in operative engagement with elastic guide rails 9 and 9' each, consisting of a unilaterally bent flat or leaf spring. The drivers 2 and 2' are under the action of the respective torsion springs 11 and 11' coiled around the respective journal pins 10 and 10' which seek to pivot the drivers clockwise.

Inserted in a forwardly tilting manner into a rigid support 12, 13 is a storage container 14 with a stack of framed diapositives 15. Provided below and to the left of the storage container is a picture gate 16 pivoted about an axle 17 and movable between the projection frame (FIGURE 2) and a loading position (FIGURE 1).

The changing device operates as follows:

The changing guide or carriage 1, shortly before it reaches the starting position thereof as shown in FIGURE 1, engages its stop member 3 against the arm 18 of the disengaging member 5 and, as a result, the latter will be pivoted counterclockwise about the eccentrically arranged axle 4 thereof. The disengaging member 5 will then engage the toothed circumference thereof against the upper edge of the lowermost diapositive 15c and advance it to a short distance so that this diapositive is adapted to be pushed through a slot 20 in the bottom of the container 14. The slot 20 is provided at opposite sides thereof with coil springs 19 which prevent the lowermost diapositive, in the case of extremely flat diapositives, from moving the next following diapositive 15d, through frictional contact therewith, since the arresting pressure of the springs 19 is greater than the greatest possible friction between two adjoining diapositives.

In the starting position (FIGURE 1) of the changing guide or carriage 1, the lowermost or first diapositive 15C has thus already been moved by the disengaging member 5 about such a distance in the direction toward the picture gate that the drivers, 2, 2' will come to rest with the back ends of the diapositive 15c and against the front frame surface of the diapositive 15d on both sides of its picture segment. At the beginning of the changing operation, in other words, when the guide or carriage 1 moves downwardly along the guide rods 6, 6', the drivers 2, 2' glide on the adjacent frame surface of the next-following diapositive under the pressure of the torsion springs 11, 11', and the studs 8, 8' are then positioned above the flat or leaf springs 9, 9' (FIGURE 1). In the lower portion of the path, that is, immediately prior to the complete insertion of the diapositive 15c into the picture gate 16, the studs 8, 8' will come into the area or range of the angularly bent portions of the leaf springs 9, 9' and bend these downwardly at that time until they finally glide over the leaf springs and springily return the same into the starting position thereof. When the guide or carriage 1 subsequently glides upwardly, the studs 8, 8' strike against the lower surfaces of the bent leaf springs and glide on the leaf springs 9, 9' against the spring pressure 11, 11' so that the drivers 2, 2' are moved out of the range of the stack of diapositives and will return to their upper starting positions.

Before the guide or carriage 1 has reached its starting position, its stop member 3 engages again against the arm 18 of the disengaging member 5 so that the latter is once again pivoted counterclockwise while moving the now lowermost diapositive 15d downwardly a small distance. At the same time, the drivers 2, 2' leave the upper end of the leaf springs 9, 9' and pivot forwardly under the spring pressure 11, 11' against the following edge of the diapositive 15e. A renewed changing operation takes place thereafter in the manner described above.

In order that the drivers 2 will still engage with certainty the last diapositive 15n of the stack 15 after the guide formed by the last diapositive has been removed and will not instead be pivoting out of the changing plane under the action of the torsion springs 11, 11', one stop member 21 (FIGURE 3) is carried by each actuator 2, 2' annd strikes against the crossbar 1' as soon as the abutting edges 22 of the drivers 2, 2' completely cover the following edge of the lantern slide to be actuated. Moreover, a weighting plate may also be placed upon the stack of diapositives 15 for the same purpose, on which the drivers 2 are guided during the feeding operation of the last diapositive 15n.

The guide or carriage 1 may be moved to and fro between the two end positions thereof with regard to the storage container 14 and the picture gate 16 by any suitable means such as a handle which is directly coordinated thereto.

In the embodiment shown in the drawing, the guide or carriage 1 is caused to move by means of a reciprocating mechanism. The latter mechanism consists of a cam plate 26 rotatable about the stationary axle 25, and carrying a crankpin 27 to which a connecting rod 28 is linked, the other end of the rod 28 being connected to the rectilinearly guided glide or carriage 1. The cam plate 26 has a peripheral gear by means of which it is in operative driving connection with either a manual or motor-actuated drive (not shown) which is put into operation for the duration of the changing of pictures.

Also disposed on the cam plate 26 is a cam groove 30 by means of which the picture gate 16 is pivoted about the axle 17 in proper synchronism with the movement of the guide or carriage 1. Such pivoting is effected by means of at least one lever 32 which is pivoted at 31 and engages in the groove 30 with a pin 33 and which is connected to the picture gate by means of a pin-slot connection 34, 34'. The picture gate itself is constituted of a U-shaped frame and coordinated thereto on both sides of the picture segment is one contact or bearing spring each 35 and 35', respectively, which press the diapositive into the vertical position of the picture gate against the projecting frame 36, rigid with the apparatus.

At the beginning of the changing operation, the connecting rod 28 is actuated by rotation of the cam plate 26 in the direction shown by the arrow, i.e., clockwise and the guide or carriage 1 is thereby moved downwardly. The drivers 2, 2' push the lantern slide 15c into the picture gate 16 so that it makes contact with or rests on the bottom 16' of this picture gate 16. Thereafter, the picture gate is swung against the projecting frame 36 by means of the lever 32, whose pin 33 has by now reached the rectilinear portion of the groove 30. Simultaneously therewith, the changing carriage 1 is pushed upwardly by the pin 27 out of the range or area of the projecting beam of rays, and the drivers 2 together with the studs 8, 8' thereof glide below the leaf spring 9 in the manner described above (see FIGURE 2). In this position of the carriage 1, the projecting beam of rays is unobstructed and the drive of the cam plate 26 is stopped for the duration of the projection of the diapositive 15c.

Figure 4:
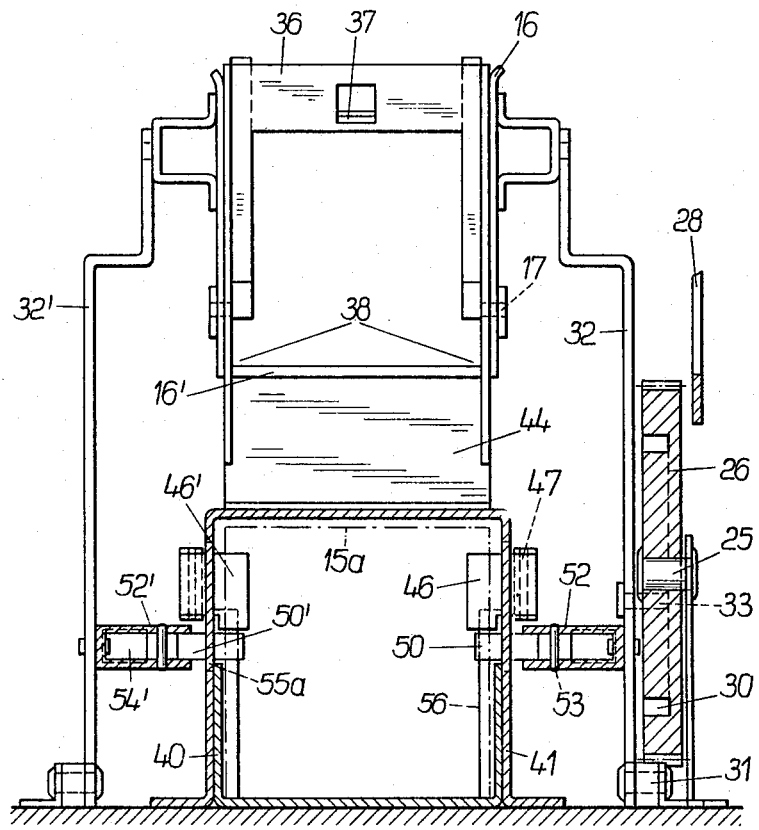
FIGURE 4 is a front elevational view of the picture gate of the changing device with the transporting or feeding mechanism for the delivery container, partly in cross section taken along line 4—4 of FIGURE 2, without the changing carriage and the storage container.

When the cam plate 26 is again driven in the direction of the arrow, the carriage 1 is pushed back into the starting position thereof according to FIGURE 1, at which time the actuators 2, 2' glide over and beyond the leaf springs 9, 9' with the studs 8, 8' thereof, in the manner described hereinabove, and rest with their back ends against the diapositive 15e following the diapositive 15d now present in the changing plane. Simultaneously therewith, the picture gate 16 is swung back into its starting position (FIGURE 1), by means of the lever 32, for receiving the diapositive 15d. The diapositive 15c is retained during this time by the hook-shaped spring 37 on the frame 36 in a vertical position until it is released from the bottom 16' of the picture gate 16 and will finally drop downwardly through a small recess 38 of the picture gate into a delivery container 40 (FIGURE 4). The latter may be inserted, like the storage container 14, in a support of the projector which is inclined toward the right according to FIGURE 1 so that the diapositives falling out of the picture gate are again stacked therein in a sequence which corresponds to the storage stack.

In the construction illustrated, the delivery container 40 is horizontally accommodated in a tunnel-like guide 41. The tunnel 41 has a recess 42, within the area of the projection plane, connected with the projection frame 36 by means of a chute 43. The chute is composed in this case of two guides 44 and 45 secured to the tunnel 41, and the guide 44 supports the projection frame 36.

Pivotally positioned about the pivot pins 47 and 47' (FIGURE 5), against the pull or traction of the springs 48 and 48', at the lateral walls of the tunnel 41, are two stop members 46 and 46' disposed opposite each other. The stop members can give way or withdraw from the end position thereof, shown in FIGURE 5, toward the right, i.e., they can pivot out of the range of the stack of diapositives being accommodated in the container 40. Accordingly, the initially empty delivery container may be pushed from the left into the tunnel 41 and, with the inwardly bent and upwardly projecting edges 56, 56' thereof, behind the stop members 46, 46' which spring back toward the right.

Additionally provided at both sides of the tunnel are two transport grippers 50 and 50' which transport or feed the delivery container 40 step by step against the pull of a tie rod 51 spring-urged to the left (FIGURE 6) by any suitable means (not shown). As is apparent particularly from FIGURE 4, the transporting grippers have pivotal connection relative to the levers 32 to swing to and fro by the action of the cam groove 30 on the lever 32'. U-shaped bearing pieces 52 and 52' are respectively secured to the levers and the grippers are pivoted respectively to the bearing pieces as at 53 and 53'. The grippers are forced by two leaf springs 54, 54', respectively, secured to the levers 32, 32' against the delivery container 40. Due to the action of the stop members 46, 46', coordinated with the bearing pieces 52, 52', the stop members will remain in the position shown in FIGURE 5 in which, extending through slots 55 and 55', respectively, of the tunnel 41, they engage in the container 40 at right angle to the tunnel axis. The transporting grippers 50, 50' are accordingly moved in the rhythm of the pivoting motion of the levers 32, 32'. The stop members 46, 46' and the grippers 50, 50' inclusive of their bearings have not been illustrated in FIGURES 1 and 2 for the sake of greater clarity.

Figure 5:
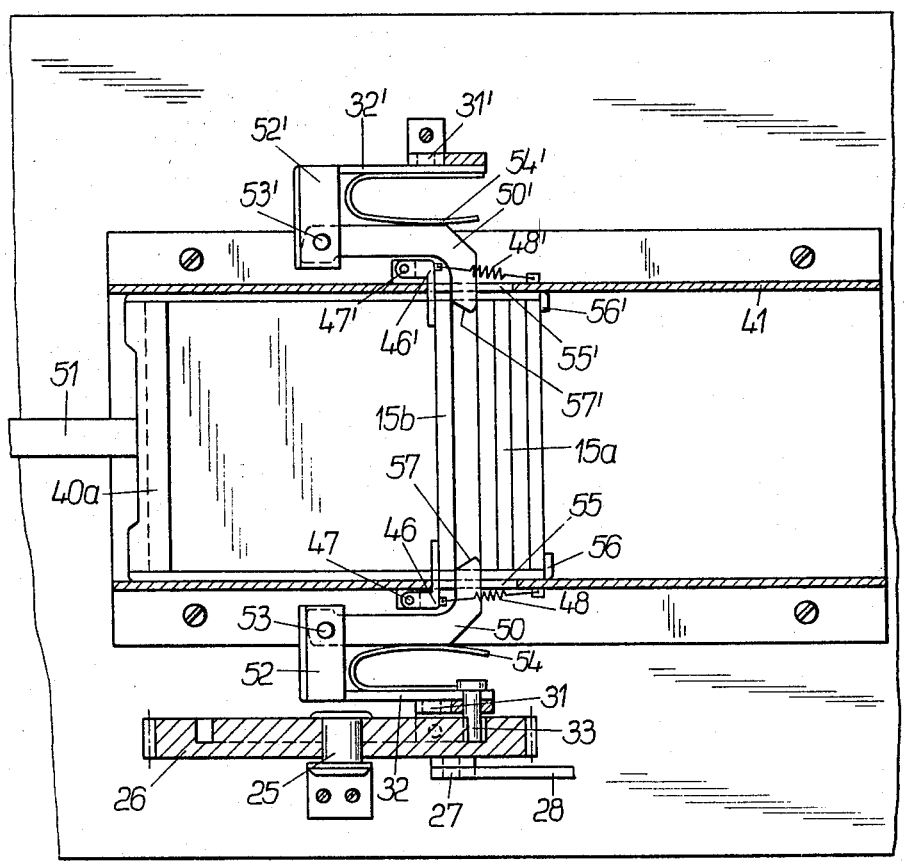
FIGURE 5 is a sectional view of the transporting or feeding mechanism for the delivery container immediately after receiving a diapositive which has just been projected, taken along line 5—5 of FIGURE 1.

Using as basis the position of the changing device shown in FIGURES 1 and 5 in which the diapositive or lantern slide 15b is projected before the diapositive 15c glides out of the plane of projection through the chute 43 into the delivery container 40, the transporting grippers 50, 50' are disposed at a distance from the stop members 46, 46' which corresponds to the greatest possible diapositive thickness so that the diapositive 15b can drop into the gap being kept free between these stop members and the grippers 50, 50'. The delivery container is provided with upwardly projecting and inwardly bent lateral end edges 56 and 56', respectively, which, when the container is empty, make contact with the rear end or back of the transporting grippers 50, 50' under the action of the tie rod 51 and serve simultaneously as bearing or contact surfaces for the stack of diapositives 15 which have already been deposited in the container. According to FIGURE 5, the stack of diapositives 15 make contact with or rest against the rear or back of the grippers 50, 50' under the action of the tie rod 51. During the subsequent counterclockwise pivoting of the levers 32, 32' which brings the picture gate 16 into the vertical position thereof, the grippers 50, 50' are moved toward the left and will at that time pivot against the spring pressure 54, 54' while gliding with their chamfered surfaces 57 and 57', respectively, over the edges of the diapositive 15b until, in the plane of the stop members 46, 46', they finally pivot back into their engaging position behind the diapositive 15b. During the pivoting operation of the grippers 50, 50', the delivery container 40 together with the stack of diapositives 15a is pulled by the tie rod 51 so that the diapositive 15b rests against the stop members 46, 46' (see FIGURE 6).

When the levers 32, 32' swing back after the projection of the diapositive 15c in the plane of projection, the picture gate 16 is brought into the position in FIGURE 1 for receiving the next-following diapositive 15d, and the grippers 50, 50' are again moved to the right. At that time, they move the delivery container 40 and the stack of diapositives already stacked and the diapositive 15d having been newly added, toward the right by one diapositive thickness so that the diapositive next in line may glide into the gap, again being formed, between the stop members 46, 46' and the grippers 50, 50' within the container 40. The next-following switching step of the grippers takes place in the manner described hereinbefore.

After the delivery container 40 has been filled, it may be released from the tie rod 51 and pulled out of the tunnel 41.

What is claimed is:

1. A changing device for lantern slides comprising a container adapted to support a plurality of superimposed stacked slides and having a discharge end from which successive slides are to be discharged in their own plane, each successive slide at said discharge end having a forward edge in the direction of discharge and a following edge, an engaging device engageable with the following edge of each successive slide to move it in said direction out of registration with the successive slides, and an actuating device engageable with the following edge of each successive slide after the latter has been moved by said engaging device for discharging such slide said engaging device being pivotally supported, and means for rocking said engaging device about its pivot to initially move each successive slide.

2. A device according to claim 1 provided with a carriage reciprocable in a plane parallel to the planes of said slides, said engaging device being pivotally supported on a fixed axis, said carriage having a portion engageable with said engaging device to turn it about its pivot in engagement with the following edge of each successive slide to impart movement thereto, said actuating device being supported by said carriage and engageable with the following edge of each successive slide to effect discharge movement thereof upon movement of said carriage in a return direction after having pivotally moved said engaging device.

3. A device according to claim 2 wherein movement of said carriage in one direction operates said engaging device, said actuating device being pivoted to said carriage and movable over and in engagement with the adjacent face of each successive slide in the movement of said carriage in the other direction, and spring means urging said engaging device toward the slides whereby, after said actuating device passes the following edge of a slide moved by said engaging device in said one direction, said actuating device moves over such following edge into engagement with the next adjacent slide to discharge the slide moved by said engaging device, upon reverse movement of said carriage.

4. A device according to claim 3 provided with means for holding said actuating device out of engagement with the adjacent slide during most of the movement of said carriage in a direction in which said engaging device becomes operative.

5. A device according to claim 3 provided with a slide holder having a normal projecting position, means for supporting said slide holder for pivotal movement between such normal position and a position in the plane of each successive slide moved from said holder, and means for moving said slide holder to the latter position during movement of each successive slide from said holder and for returning said slide holder to projecting position after a slide has been moved thereinto.

6. A device according to claim 5 wherein said means for moving said slide holder comprises a pivoted lever, and a rotary cam engaging said lever to swing said slide holder between its two said positions.

7. A device according to claim 6 provided with a wheel carrying said cam, an eccentric pin carried by said wheel, and a link connected at one end to said pin and pivotally connected at its upper end to said carriage whereby said wheel effects both reciprocating movement of said carriage and movement of said slide holder between its said two positions.

8. A device according to claim 7 provided with a horizontally elongated receiver beneath said slide holder to receive slides moving vertically downwardly therefrom after projection, and means for moving said receiver in a step-by-step movement approximately the thickness of each slide to receive successive slides after they have been projected.

References Cited
UNITED STATES PATENTS 3,273,454    9/1966    Bast _____ 40—79 XR EUGENE R. CAPOZIO, *Primary Examiner.*

WILLIAM H. GRIEB, *Assistant Examiner.*